USOO5959689A

United States Patent [19]
De Lange et al.

[11] Patent Number: 5,959,689
[45] Date of Patent: Sep. 28, 1999

[54] MULTI-MEDIA PROCESSOR ARCHITECTURE WITH HIGH PERFORMANCE-DENSITY

[75] Inventors: Alphonsius A. J. De Lange; Peter H. N. De With, both of Eindhoven, Netherlands

[73] Assignee: U.S. Philips Corporation, New York, N.Y.

[21] Appl. No.: 08/683,995

[22] Filed: Jul. 19, 1996

[30] Foreign Application Priority Data

Jul. 21, 1995 [EP] European Pat. Off. .............. 95202008
Nov. 8, 1995 [EP] European Pat. Off. .............. 95203031

[51] Int. Cl.$^6$ ..................................................... H04N 5/14
[52] U.S. Cl. ............................................ 348/571; 395/17
[58] Field of Search ........................... 348/571; 358/447; 395/800, 800.35, 800.36, 800.34, 800.17, 800.11, 800.21

[56] References Cited

U.S. PATENT DOCUMENTS

| 4,811,052 | 3/1989 | Yamakawa et al. .................. 355/14 C |
| 5,113,494 | 5/1992 | Menendez et al. . | |
| 5,140,444 | 8/1992 | Klein et al. . | |
| 5,392,446 | 2/1995 | Tower et al. ............................. 395/800 |
| 5,506,998 | 4/1996 | Kato et al. ............................... 395/800 |
| 5,588,152 | 12/1996 | Dapp et al. ............................. 395/800 |

FOREIGN PATENT DOCUMENTS 2223335   4/1990   United Kingdom .

OTHER PUBLICATIONS

Mahon et al, "Hewlet–Packard Precision Architecture: the Processor", Hewlett–Packard Journal Aug. 1986.

*Primary Examiner*—Andrew I. Faile
*Assistant Examiner*—Uyen Le
*Attorney, Agent, or Firm*—Brian J. Wieghaus

[57] ABSTRACT

A multimedia system has unprogrammable task-specific processors of high performance-density. The task-specific processors perform primitive functions that together constitute a video algorithm. The task-specific processors are interconnected via a high-speed communication module whose interconnectivity is controlled by an arbiter. The arbiter stores a data flow graph. A fully programmable general-purpose processor of low performance-density carries out those tasks that are not readily mapped onto the primitive functions. This configuration with different levels of performance-density and programmability increases overall system performance-density with regard to the prior art.

18 Claims, 6 Drawing Sheets

MULTI-MEDIA PROCESSOR ARCHITECTURE WITH HIGH PERFORMANCE-DENSITY

FIELD OF THE INVENTION

The invention relates to a video data processing system operative to process video data according to a video algorithm, and comprising multiple processors interconnected via communication means. The multiple processors are preferably, but not necessarily, integrated together on a single semiconductor substrate.

BACKGROUND ART

One of the major developments within the field of information technology that currently receive ample attention concerns multi-media software applications. Multi-media applications typically enable combining on a high-resolution display, preferably interactively and in real-time, a plurality of information streams originating from different sources such as video, graphics and audio equipment. The requirement of cost-effective real-time processing of huge information streams makes great demands on the chip designers. The effort that the industry puts into improving performance of programmable computer architectures mainly focuses on boosting clock rates and on extending parallelism at the instruction level and the task level.

Texas Instruments has recently introduced a fully programmable digital signal processor, called the Multimedia Video Processor (MVP) TMS320C80. The MVP accommodates on a single semiconductor substrate one 100 MFLOP (million of floating-point operations per second) floating-point fully programmable RISC processor, four uniform, fully programmable 500 MOPS (million of operations per second) parallel processors (DSPs) with multiple data streams connected via a cross-bar network to 25 banks of 2K Byte SRAM for data and instruction caches, and an I/O controller for 400M Byte/sec off-chip communication. The RISC processor handles system control and communication with external processors. Since it is the only one with a floating-point unit, the RISC processor also is the preferred processor for performing floating-point-intensive computations. The DSPs are fully programmable in C or in assembly, and are especially suited for execution of multiply-accumulate-intensive algorithms. Each of the DSPs can execute 3 to 15 RISC instructions in parallel each cycle. The full programmability, similar to that of today's general-purpose processors, supports the dynamic selection among a variety of image compression techniques such as JPEG and MPEG. The full programmability is to allow the processors to perform virtually any task. See, for example, "The MVP: A Single-Chip Multiprocessor for Image and Video Applications", R. J. Gove, SID 94 Digest pp. 637–640, "A Single-Chip Multiprocessor For Multimedia: The MVP", K. Guttag et al., IEEE Computer Graphics & Applications, November 1992, pp. 53–64, or "A Single Chip Multimedia Video Processor", K. Balmer et al., Proc. of the IEEE 1994 Custom Integrated Circuits Conference, San Diego, Calif., May 1–4, 1994, pp. 91–94.

Typically, multi-media video algorithms are most easily designed in a high-level programming language. A compiler is then used to generate an executable code for the general-purpose programmable processors. This certainly applies to the MVP, as it is extremely difficult to program parallel processors without high-level support tools. To safeguard against possible conflicts among the parallel processors, e.g., unforeseen contention for access of the same memory, the MVP includes additional hardware such as prioritization circuitry and re-try circuitry.

One of the measures for quantifying the capabilities of a processor is the compute-performance per square millimetre of semiconductor substrate area, a quantity also referred to as "performance-density". Generally, the performance-density of general-purpose processors is considerably lower than that of specialized processors with limited programmability, and also considerably lower than the performance-density of dedicated hardware solutions. This low performance-density derives from, among other things, hardware overhead (e.g., additional circuitry and interconnections) needed to implement the programming functionalities, and also from a somewhat inefficient use of the available hardware. With regard to the latter, not every clock cycle is used for computation if one has to wait for the arrival of data to be processed. Accordingly, the MVP's performance-density is considerably limited due to the use of fully programmable general-purpose DSPs and a fully programmable general-purpose RISC processor. Another disadvantage is that instruction traffic can be a problem in the MVP if the programs do not fit into the MVP's instruction caches. This becomes a particularly more serious problem when frequent context switches are necessary on account of, e.g., real-time demands during multi-tasking operation. The MVP is not capable of dynamic context switches in a single DSP.

OBJECT OF THE INVENTION

It is, inter alia, an object of the invention to provide a multi-media video data processor system whose performance-density is substantially higher than that of the system of the prior art.

SUMMARY OF THE INVENTION

To this end, the invention provides a system as specified in the preamble, characterized by the following features. The multiple processors include a plurality of respective task-specific processors for execution of a respective one of a plurality of primitive functions occurring in the algorithm at an image processing level. That is, the primitive functions relate to characteristics specific to the processing of video or graphics images. Typically, a respective primitive function includes a respective one of following tasks: filtering; DCT; colour space conversion; sample rate conversion; motion estimation and motion compensation; feature extraction; blending of graphics data and video data; table look-up, variable-length decoding. Each of the task-specific processors has a performance-density considerably higher than that of a typical general-purpose processor. Each of the task-specific processors is un-programmable or has a level of programmability substantially lower than that of a general-purpose processor, e.g, one or more of the task-specific processors are parametrizable. The communication means comprises a high-speed communication module coupled in parallel to the task-specific processors for enabling parallel communication among arbitrary ones of the task-specific processors.

The communication means preferably comprises a communication arbiter operative to control the communication module under guidance of a data flow graph stored in the communication arbiter.

Typically, a general-purpose RISC processor has a performance-density in the order of 1–5 MOPS/mm$^2$, a DSP has a performance-density in the order of 5–10 MOPS/mm$^2$, and a task-specific processor for carrying out a given primitive function has a performance-density in the order of 50–100 MOPS/mm². For example, in the invention a task-specific processor implementing a variable phase delay filter is capable of 80 MOPS/mm². This is not only due to the processor being optimized for a specific task, but also to the multiple use of the filter for sample-rate conversion, time-base correction and geometric image correction in the multitasking environment provided by the system in the invention. Above numerical values of the compute performance-density are mentioned only by way of example and relate to the present state of the art. More importantly, the above classification illustrates that the compute-performance densities of low, medium and high performance-density processors typically differ from one another by an order of magnitude or more.

Preferably, the multiple processors further comprise at least one programmable general-purpose processor of low performance-density. The general-purpose processor can execute a further processing function occurring in the algorithm, the function being too irregular in its algorithmic structure to be mapped onto the task-specific processors. A particular one of the task-specific processors is operative to, e.g., handle the high-speed data rates occurring at the interface between the task-specific processors and the general purpose processors. This particular processor extracts specific information from the data streams and converts it to a lower data rate and a format suitable for the general-purpose processor. The general-purpose processor can also use this feature extractor as an I/O processor for access of the background memory. Low-speed information generated by the general-purpose processor can be sped-up to display rates by a special task-specific processor.

Preferably, the multiple processors further comprise at least one processor of medium performance-density, typically a DSP, for control of the task-specific processors and for execution of irregular portions of the video algorithm that cannot readily be mapped on the primitive functions. The processor of medium performance-density has a level of programmability that lies between that of a fully programmable general-purpose processor and the task-specific, high-performance-density processor implementing a primitive function. The processor of medium performance-density can also be a graphics co-processor.

The rationale of the invention is explained with reference to the following observations made by the inventors.

A first observation is that, as explained above, the performance-density of a general-purpose programmable processor is considerably lower than that of task-specific (i.e., special-purpose or optimized for a particular routine) processors with limited or no programmability or of dedicated hardware, rendering general-purpose solutions unsuitable for high-speed video processing.

A second observation is that high-speed computations within the multi-media/video/graphics processing applications have little complexity and therefore can be described easily in a more constrained programming language, such as a strict data flow language without conditional branching. This description can then be mapped efficiently onto data flow processors without a branching unit that have much higher performance-densities than the general-purpose processors.

A third observation is that typical multi-media video processing applications are composed of relatively complex primitive functions at the image processing level. Typical examples of multi-media video applications are the following: image enhancement, such as noise reduction; decoding of analog video and audio signals; zooming/de-zooming; picture control through, e.g., brightness, gamma, or contrast; operations involving high-resolution graphics; video data compression and decompression; data communication.

A fourth observation is that these applications have a large set of primitive functions in common. Typical examples of these relatively complex primitive functions are: FIR filtering and DCT; colour space conversion; horizontal sample-rate conversion with or without filter operations; vertical sample-rate conversion with or without filter operations for simple motion compensation; motion estimation and motion compensation; feature extraction; blending of graphics and video; table look-up and table updating; variable-length decoding. Breaking these relatively complex primitive functions further down into a higher number of elementary operations at a lower level of abstraction, such as additions and multiplications, would require basic processors in the form of adders, multipliers, accumulators, arithmetic logic units, etc. Several of these basic processors then are intended for being used in parallel/pipeline or in sequence to create a single one of the primitive functions. However, the overhead would become larger for a lower level of abstraction owing to the programming of the individual basic processors and the communication between the processors. Consequently, the performance-density would be significantly low. Instead of breaking down these relatively complex primitive functions into a plurality of more elementary operations, the functions can also be generalized to some extent through parametrization. This way they will fit into a broad class of more complex multi-media video algorithms. The reason for this approach is that further breaking down of the complex primitive functions will neither increase flexibility of the hardware nor its programmability. Instead, it would lead to IC implementations that are inefficient compared to the implementation of parametrized complex primitive functions.

A fifth observation is that a large class of different multi-media video processing applications are composed of a small set of primitive functions.

A sixth observation is that a large class of processing applications use a number of complex primitive functions in parallel or in pipeline.

A seventh observation is that each of said primitive processing functions requires a performance typically in the range of 100–800 MOPS, wherein an operation is an addition, or a subtraction, a multiplication, a division, comparison, memory reference, etc, assuming a video sample rate of 13.5 MHz with 2×12 bits per sample for luminance/chrominance encoding and 3×12 bits per sample for RGB encoding. Running a processing application that includes several algorithms or running several applications in parallel increases the performance requirements accordingly to 400–2000 MOPS per primitive function. Clearly, no general-purpose programmable DSP is going to provide such high performance at a reasonable price.

An eighth observation is that some portions of the video algorithm may not be suitably mapped onto the primitive functions of the task-specific processors. A fully programmable general-purpose processor of low performance-density or a processor of medium performance-density such as a DSP is to be provided to take care of those portions.

A ninth observation is that control of the task-specific processors as well as the execution of portions in the video algorithm that cannot be mapped onto the primitive functions both require more complex algorithms at a lower speed and therefore are better governed by processors having at least some flexibility.

In summary, the inventors have realized that the specific character of video algorithms permits the use of task-specific, un-programmable or weakly programmable processors, wherein each respective one thereof is optimized to perform a respective single one of a set of primitive functions of the video algorithm. The system of the invention uses task-specific processors that have a high performance-density and have an, at the most, low level of programmability. Under some circumstances, ASICs and even FPGAs may be good candidates for the task-specific processors. Moreover, the task-specific processors are typically non-uniform. Note that the prior art uses only general-purpose, fully programmable and uniform processors instead. The system of the invention is referred to as a heterogeneous processor system.

Advantages reside in a considerable increase in performance-density with regard to the prior art on account of the reduction in programmability overhead, and in a simplified programming owing to the modular division of the algorithm in primitive functions. Fully programmable general-purpose processors of low performance-density perform the tasks that cannot be readily mapped onto the primitive functions. Further processors having an intermediate level of programmability and an intermediate level of performance-density are provided to control the task-specific processors. The further processors may also take care of algorithmic portions that cannot be mapped onto the primitive functions but are capable of being suitably executed by processors having an intermediate level of performance-density and of programmability. Thus, the invention introduces a hierarchical processing concept with different levels of programmability and compute performance-density in order to achieve an overall higher system performance-density than is provided by prior art systems.

The invention is particularly, but not exclusively, suitable for general audio/video processing in, e.g., TV's (TXT decoding and decoding of sound), camera's, VCR's, CD-I apparatus and multimedia PC's. The types of primitive functions used in a particular system may depend on the application domain, e.g., TV, video, CD-I, set-top boxes, etc.

DESCRIPTION OF THE DRAWING

The invention is explained below in further detail and by way of example with reference to the accompanying drawing, wherein.

Figure 1:
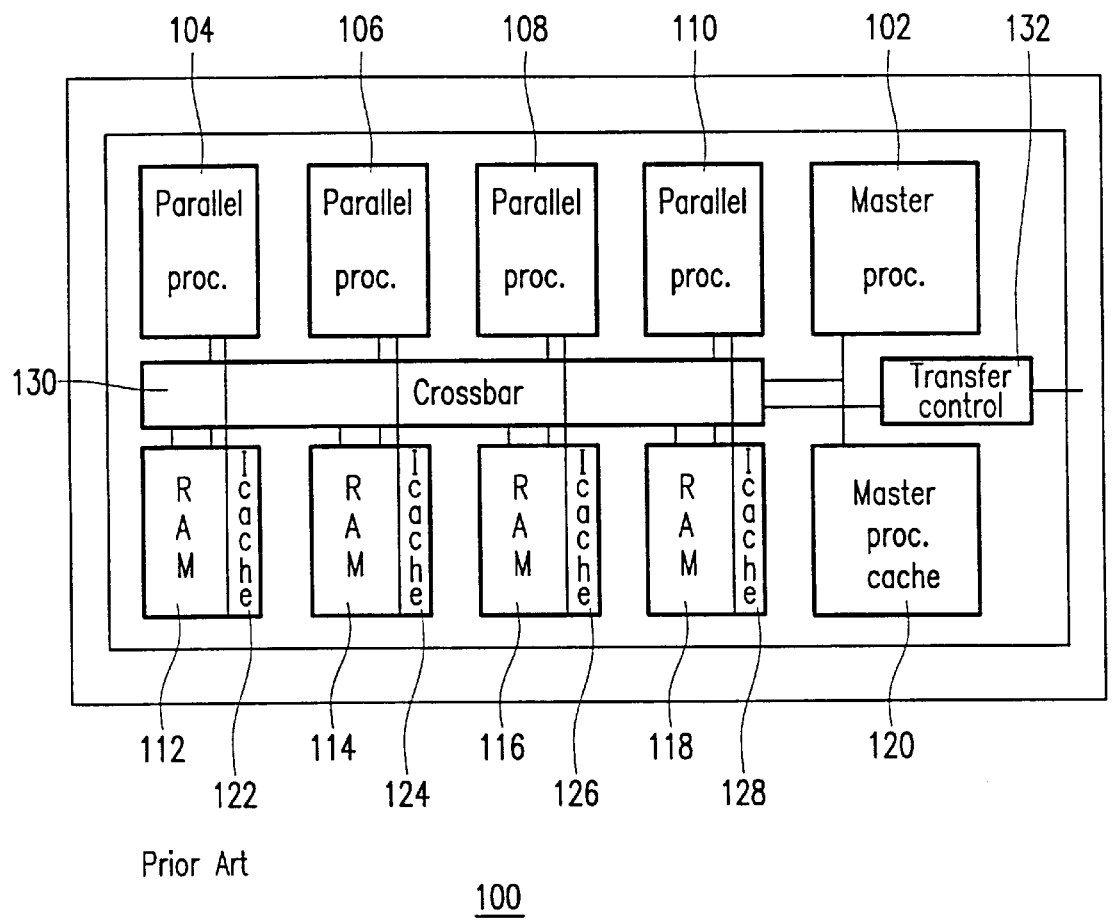
FIG. 1 is a block diagram of a prior art multi-processor architecture.

Throughout the drawing like reference signs indicate corresponding or similar features.

DETAILED EMBODIMENTS

Prior Art

FIG. 1 is a block diagram of the single chip multi-processor architecture of the prior art multi-media video processor (MVP) 100 discussed previously. MVP 100 comprises a master processor 102, a plurality of uniform parallel processors (DSPs) 104, 106, 108 and 110, a plurality of memory modules 112, 114, 116, 118, 120, 122, 124, 126 and 128, a cross-bar switch 130, and a transfer controller 132.

Master processor 102 is a general purpose RISC processor provided with a floating-point unit. Master processor 102 controls the operation of DSPs 104–110 and governs communication with external processors (not shown). Master processor 102 is further capable of performing low-performance computing tasks. DSPs 104–110 are fully programmable parallel processors. Memory modules 112–118 can all be accessed in parallel by DSPs 104–110 via cross-bar switch 130 and serve as shared data memories. Memory module 120 serves as both instruction and data cache for master processor 102. Memory modules 122–128 serve as respective instruction caches for respective ones of DSPs 104–110. Cross-bar switch 130 enables DSPs 104–110 to access each one of memory modules 112–118 independently and in parallel with accesses of other ones of modules 112–118. DSPs 104–110 each have two data memory ports, master processor 102 has one data memory port, and transfer controller 132 has one data memory port, all of which can access modules 112–118 in parallel via cross-bar 130. Transfer controller 132 manages memory traffic between on-chip memories 112–118 and off-chip memories (not shown) using a priority scheduling of memory access requests. For aspects inherent in this configuration, reference is made to the background art section above.

First Embodiment of the Invention

Figure 2:
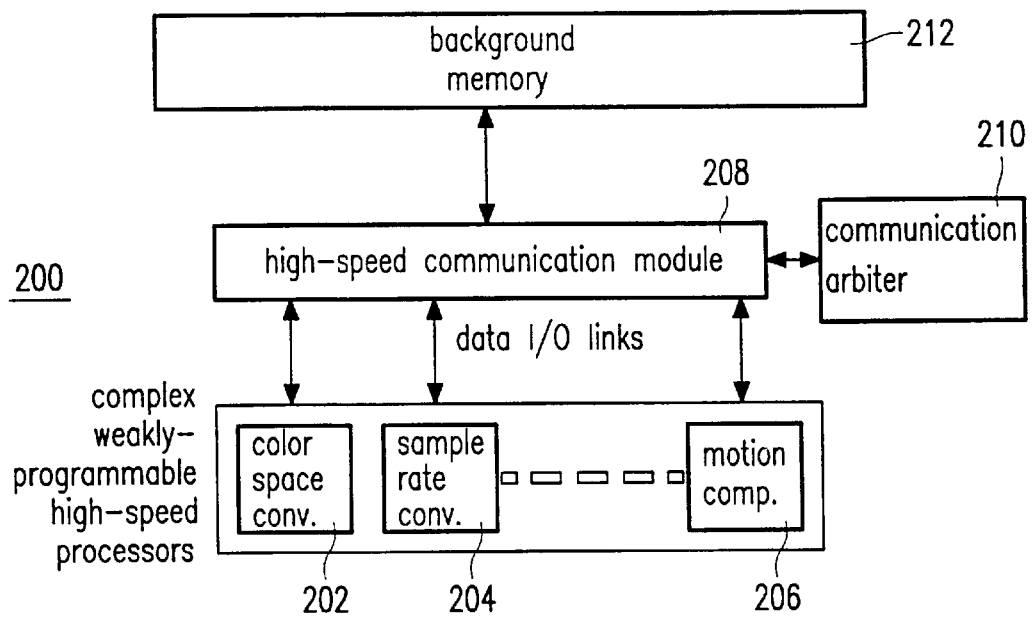
FIGS. 2 and 3 are a block diagrams of a multi-processor architecture in the invention.

FIG. 2 is a block diagram of a first embodiment of a multi-processor architecture for a video data processing system 200 in the invention. System 200 is operative to process video and graphics data in a multi-media software application. System 200 comprises multiple task-specific processors 202, 204, . . . , and 206 of high performance-density. Task-specific processors 202–206 serve to execute the primitive complex functions of video signal processing algorithms. Examples are colour space conversion, sample rate conversion, . . . , motion compensation, etc. Processors 202–206 are either not programmable at all or have a low level of programmability in the sense that their behaviour is parametrized. A low-level programmability enables processors 202–206 to be used in different algorithms, wherein the same primitive functions are employed but with different parameter values. Preferably, high-speed control is available either inside or outside processors 202–206 in order to allow switching between different sets of parameter values, and in order to allow saving/restoring of internal data states of a parametrized processor, e.g., processor 202. The updating of parameter values for a particular algorithm, e.g., as a consequence of user-interaction, is typically accomplished at a much lower rate. Parameter reload is achieved, for example, via a separate bus (not shown). For the sake of brevity, the expression "low-level programmability" is used below to cover both un-programmable and parametrizable processors.

Within the context of multi-media, most algorithms and processing applications employ a number of complex primitive functions in parallel or in pipeline. Preferably, processors 202–206 must be capable of communicating with each other in parallel in such a manner that all processors 202–206 can be kept running in parallel. Therefore, system 200 includes a high-speed communication module 208 and a communication arbiter 208. Module 208 implements the desired interconnections between processors 202–206. Module 208 includes, for example, a high-speed very-wide bus, a register file, or a cross-bar with buffers or with small register files. Communication arbiter 210 governs the communication between task-specific processors 202–206 via module 208 and between task-specific processors 202–206 on the one hand and a background memory 212 on the other hand. To this end, a data flow graph that governs the communication protocol and the routing of data among processors 202–206 is stored in communication arbiter 210. The data flow graph prescribes which ones of processors 202–206 are communicating with one another and with background memory 212 at any particular instant. Essentially, arbiter 210 enables interconnecting processors 202–206 in any desirable manner. Depending on the internal buffer capacity of processors 202–206, arbiter 210 preferably is capable of controlling the interconnections in communication module 208 at clock rates (no buffering) down to line rates (line buffers aboard of processors 202–206 and/or in communication module 208). Communication module 208 possibly accommodates an internal memory (not shown).

Second Embodiment

Figure 3:
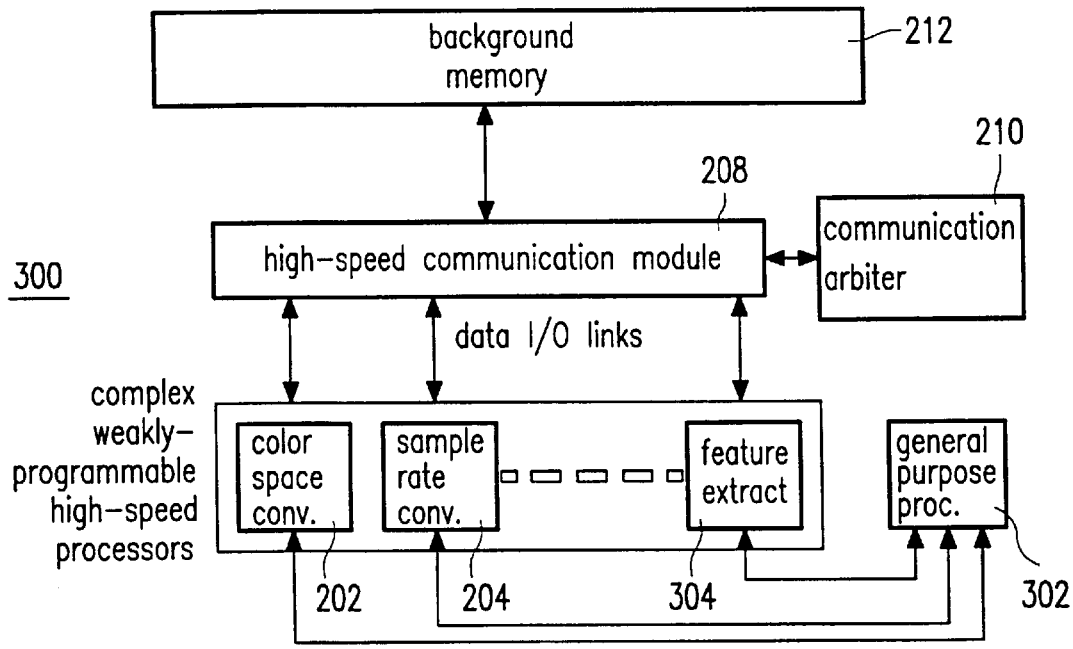

FIG. 3 is a block diagram of a second embodiment of a multi-processor architecture for a video data processing system 300 in the invention. System 300 comprises a general-purpose processor 302 in addition to parts 202–212 discussed above.

It is always possible that some part of a processing application cannot be readily mapped onto a task-specific parametrized processor such as processor 202, 204 or 206, on account of, e.g., a low degree of regularity in the application's algorithmic configuration. Accordingly, one or more processors 302 are used that are sufficiently programmable in order to process these irregular algorithms. The mixed processing approach is reflected by system 300 wherein general-purpose processor 302 communicates with task-specific processors 202–206 to enable continuous data exchange between specific and more general processing tasks. As discussed above, it is clear that processor 302 has a considerably lower performance-density than task-specific processors 202–206. Consequently, performance constraints as regards irregular algorithms must be lower than those concerning highly regular multimedia computing functions. Fortunately, this is true for most multimedia computing algorithms used in video/audio equipment and multimedia terminals.

A data rate lying between the high-speed data rates occurring at the interfaces of task-specific processors 202–206, on the one hand, and the low-speed data rates at the general-purpose processors 302 at the other hand, is referred to herein as an intermediate data rate. The intermediate rate occurs, for example, in a feature extractor 304 when special information is extracted from the data streams for conversion to a lower rate and a suitable format in order to have it processed by a processor of a more general type such as processor 302. General-purpose processor 302 can also use feature extractor 304 as an I/O processor for accessing data in background memory 212. On the other hand, low-speed data generated by a low-speed general purpose processor such as processor 302 can be sped-up to a display rate by a special processor such as processor 304 or to an even higher rate by a graphics display processor (not shown).

Third Embodiment

Figure 4:
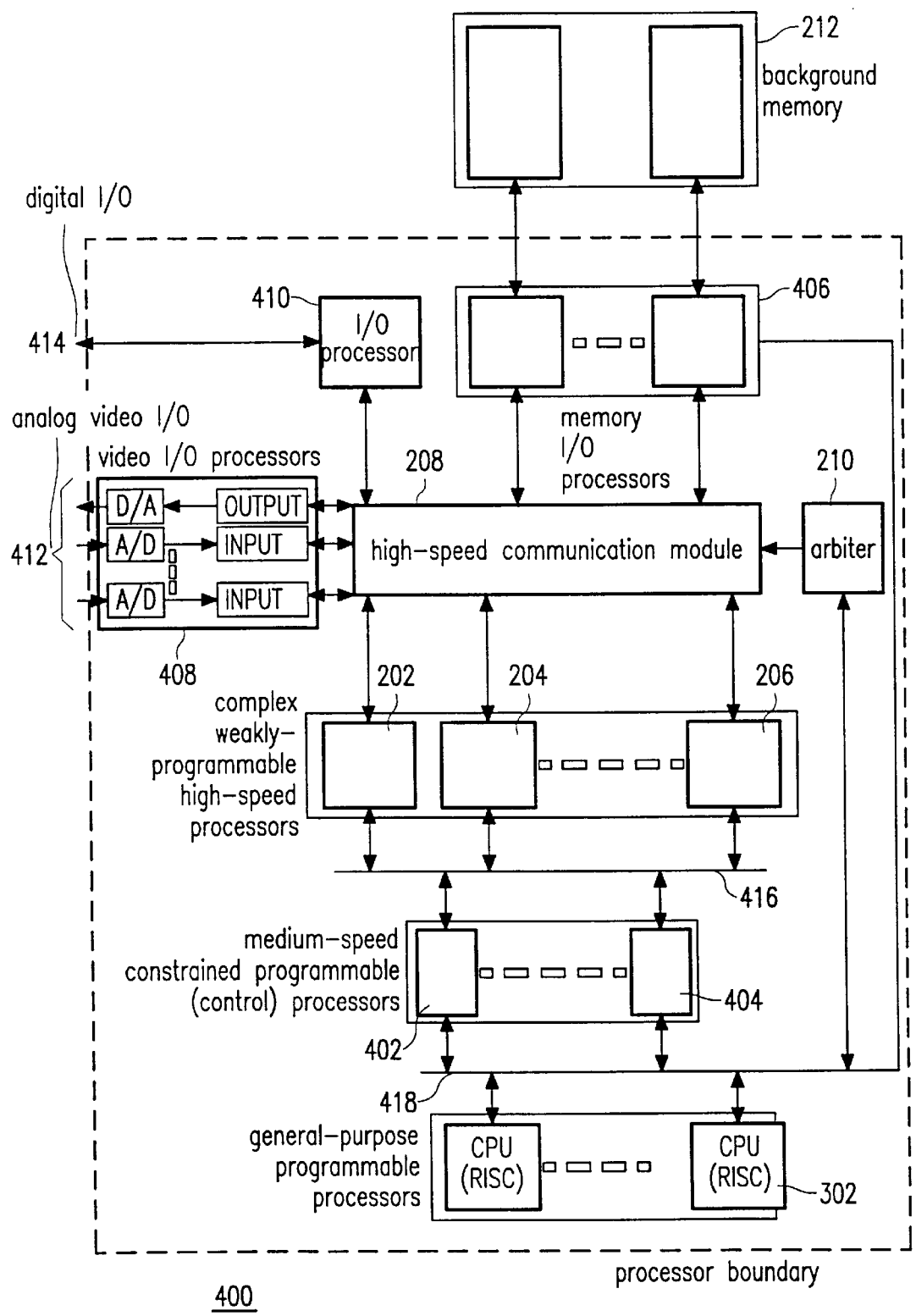
FIG. 4 is a more detailed block diagram of a multi-processor architecture in the invention.

FIG. 4 is a more detailed block diagram of a multi-processor system 400 in the invention. The concept of having general-purpose processors of low performance-density and task-specific processors of high-performance density running different portions of the same algorithms now is extended towards a more general multi-layer or heterogeneous architecture.

System 400 includes task-specific signal processors 202–206 and general-purpose processors 302 as discussed above. In addition, system 400 comprises one or more further processors 402, . . . , 404 that have an intermediate level of programmability (constrainedly programmable) and an intermediate level of performance-density. The term "intermediate" refers to the level lying between those of a typical general-purpose processor 302 and those of a task-specific processor, e.g., processor 202. Processors 402–404 provide some sort of a compromise between performance-density on the one hand and programmability on the other. A dedicated programmable processor such as a graphics co-processor or a digital signal processor (DSP) also falls into the category of such constrainedly programmable processors with an intermediate performance-density. Typically, constrainedly programmable processors 402–404 are operative to execute a broad class of control algorithms, including decision making, branching, and looping, for which it can read a complex control program. Processors 402 and 404 are used primarily for control of high-speed processors 202–206. In addition, processors 402–404 are used for the execution of medium-speed algorithm portions as well that cannot be mapped onto task-specific processors 202–206.

The processors in the invention have different levels of compute performance-density and different degrees of programmability. Performance-density and programmability are related in such a manner that the higher the performance-density, the lower is the programmability. System 400 employs the processors in a functionally layered configuration wherein the function of a specific one of processors 202–206, 402–404, and 302 makes the best of the processor's compute-performance density and its degree of programmability in the light of the processing or control tasks to be performed, thus optimizing overall performance of system 400. A high performance-density processing layer is formed by task-specific processors 202–206 used for carrying out the primitive functions. Memory interface processors 406, and I/O processors 408 and 410 connected to ports 412 and 414, are task-specific as well. A processing layer of intermediate performance-density is formed by constrainedly programmable processors 402–404. A low performance-density processing layer is formed by general-purpose fully programmable processors 302 that are, e.g., RISC processors.

High-speed communication occurs between task-specific processors 202–206, I/O ports 412 and 414 and background memory 212 via high-speed communication module 208. Medium-speed communication takes place between constrainedly programmable processors 402–404 and task-specific processors 202–206 using a medium-speed bus 416 or dedicated interconnections (not shown). Low-speed communication arises between fully programmable general-purpose processors 302 and constrainedly programmable processors 402–404, between processors 302 and arbiter 210, and between processors 302 and background memory 212 via a memory interface processor among memory interface processors 406. The low-speed communication uses a bus interface 418. Background memory 212 is segmented into memory banks, possibly having different bandwidths per memory bank.

Preferably, all processors 202–206, 302, 402–404, 406–410 are suitable for multi-tasking and have internal memories (not shown) for state saving of data or state restoring of data, program storage and parameter storage.

For the purpose of communication handling all processors preferably have local caching/buffering provisions. Preferably, all processors have a scheduler for controlling local and dynamic interaction via handshake protocols or local/global interaction through static schedule control programs.

Flow Graph

Figure 5:
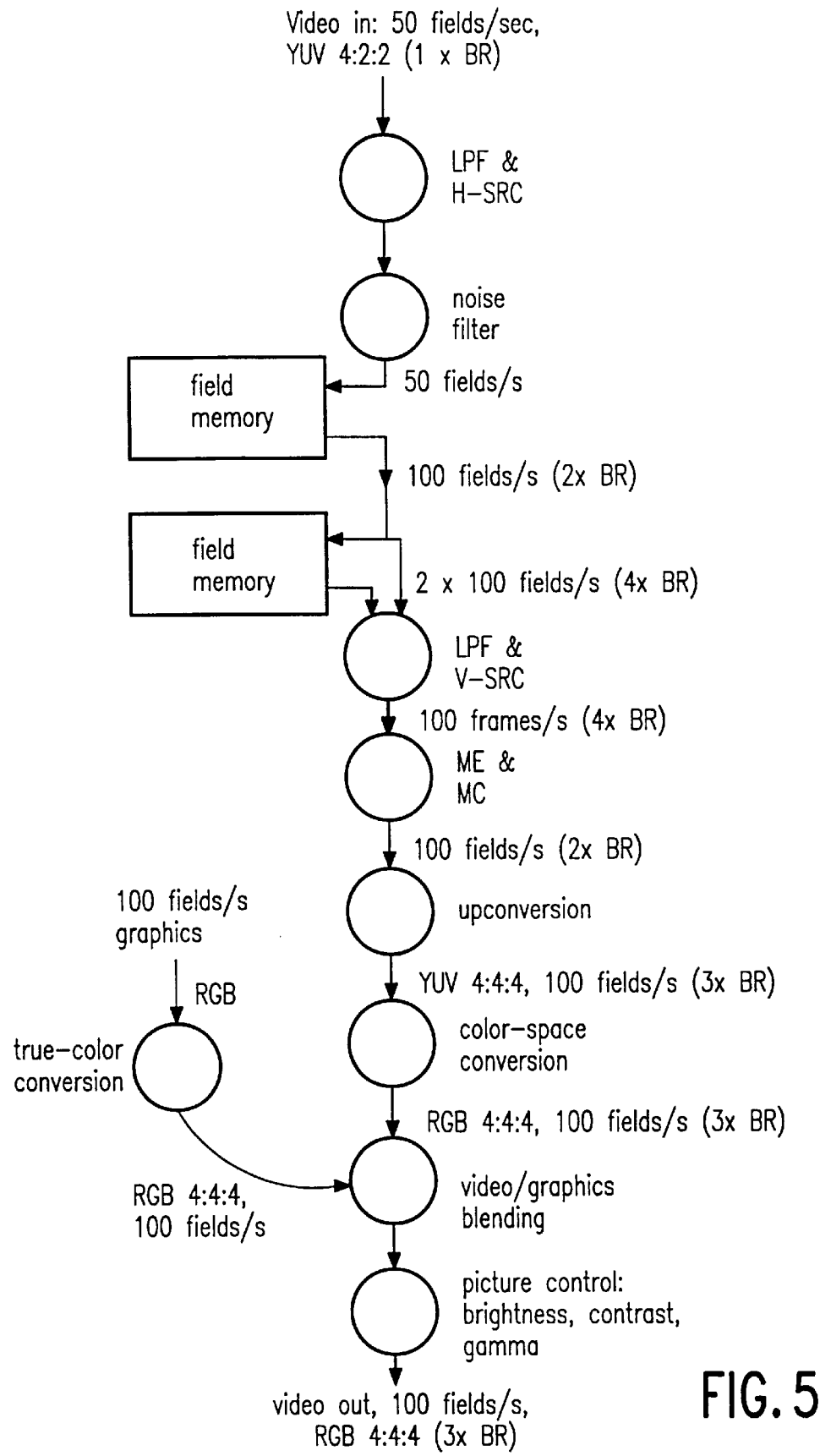
FIG. 5 is a dataflow graph for an advanced television processing application.

FIG. 5 is an example of a dataflow graph for an advanced television processing application. In the following it is assumed that clock rates in the order of 54–70 MHz are feasible for consumer IC implementations. For basic video rates in the order of 13.5M–18M pixels/second, i.e., for basic byte rates (BR) of 27–36 Mbyte/second, each high-speed processor then can perform 4 high-speed operations in (semi-) parallel.

The processing application in this example comprises, for example, low-pass filtering (LPF), horizontal/vertical zoom, noise reduction, motion estimation (ME) and motion compensation (MC), video/graphics blending, and picture control functions such as brightness, hue and contrast enhancement. The compute requirements for each of these functions lie in the order of 100 to 800 MOPS, which is too high to enable simultaneous implementation of all functions by a single general purpose processor.

FIG. 5 identifies the following types of complex primitive functions: horizontal sample rate conversion (H-SRC) including filter operations; vertical sample rate conversion (V-SRC) including special filtering for simple motion compensation; motion estimation (ME) and motion compensation (MC); colour space conversion; blending of video and graphics; and table look-up for picture control. Note that the compute-intensive portion of each of the operations illustrated in the graph of FIG. 5 can be mapped to one of these primitive functions. However, due to their inherent irregularity the low-frequent control and signal processing part have to be executed by a general-purpose processor. Furthermore, some parts of specific ones of the operations shown in FIG. 5 may be mapped to a plurality of primitive functions. For example, the "control" operation may require two separate colour space conversion steps to allow for different forms of gamma modifications.

Each of above six primitive functions is to be executed by a single task-specific processor such as one of processors 202–206. A certain number of processors is required in order to execute the application in FIG. 5. This number and the total number of processors required can be determined for a given maximum data throughput rate. The data throughput rate in the following is expressed in units of BR as defined above. The table below lists the operations of the graph in FIG. 5 and their data input rate in the column "in", their data output rate in the column "out", and the maximum of the numbers under "in" and "out", all in BR units.

| Operations | in | out | max |
|---|---|---|---|
| LPF & H-SRC | 1 | 1 | 1 |
| noise filtering | 1 | 1 | 1 |
| LPF & V-SRC | 4 | 4 | 4 |
| ME & MC | 4 | 2 | 4 |
| upconversion | 2 | 3 | 3 |
| YUV-RGB colour space conversion | 3 | 3 | 3 |
| video/graphics blending | 3 | 3 | 3 |
| picture control input processing | 3 | 3 | 3 |
| picture control output processing | 3 | 3 | 3 |
| picture control gamma modification | 3 | 3 | 3 |
| graphics/true-colour conversion | 3 | 3 | 3 |

TABLE

According to the table a total throughput of 31 is required in order to carry out the operations of FIG. 5. Each processor is capable of performing 4 high-speed signal processing tasks in parallel under the assumptions given in the preamble of this section. Therefore, in theory, a minimum number of 8 processors (31/4 rounded off upwards) is needed to meet this objective. Due to the character of the task-specific processor, operations that require similar algorithms are efficiently executed by a single task-specific processor. Similar operations are therefore clustered. For example, the LPF & H-SRC operation is clustered with the noise filtering and the upconversion, requiring 2 (5/4 rounded off upwards) task-specific processors. The YUV-RGB conversion is clustered with the picture control input processing and the picture control output processing, requiring 3 (9/4 rounded off upwards) processors. The graphics/true-colour conversion and picture control gamma modification are clustered, needing 2 (6/4 rounded off upwards) task-specific processors. Altogether, a number of 10 task-specific processors are needed to carry out the application of FIG. 5. Note that the 10 processors are not fully employed. This may give some room for modification or extension without the need for additional task-specific processors.

Fourth Embodiment

Figure 6:
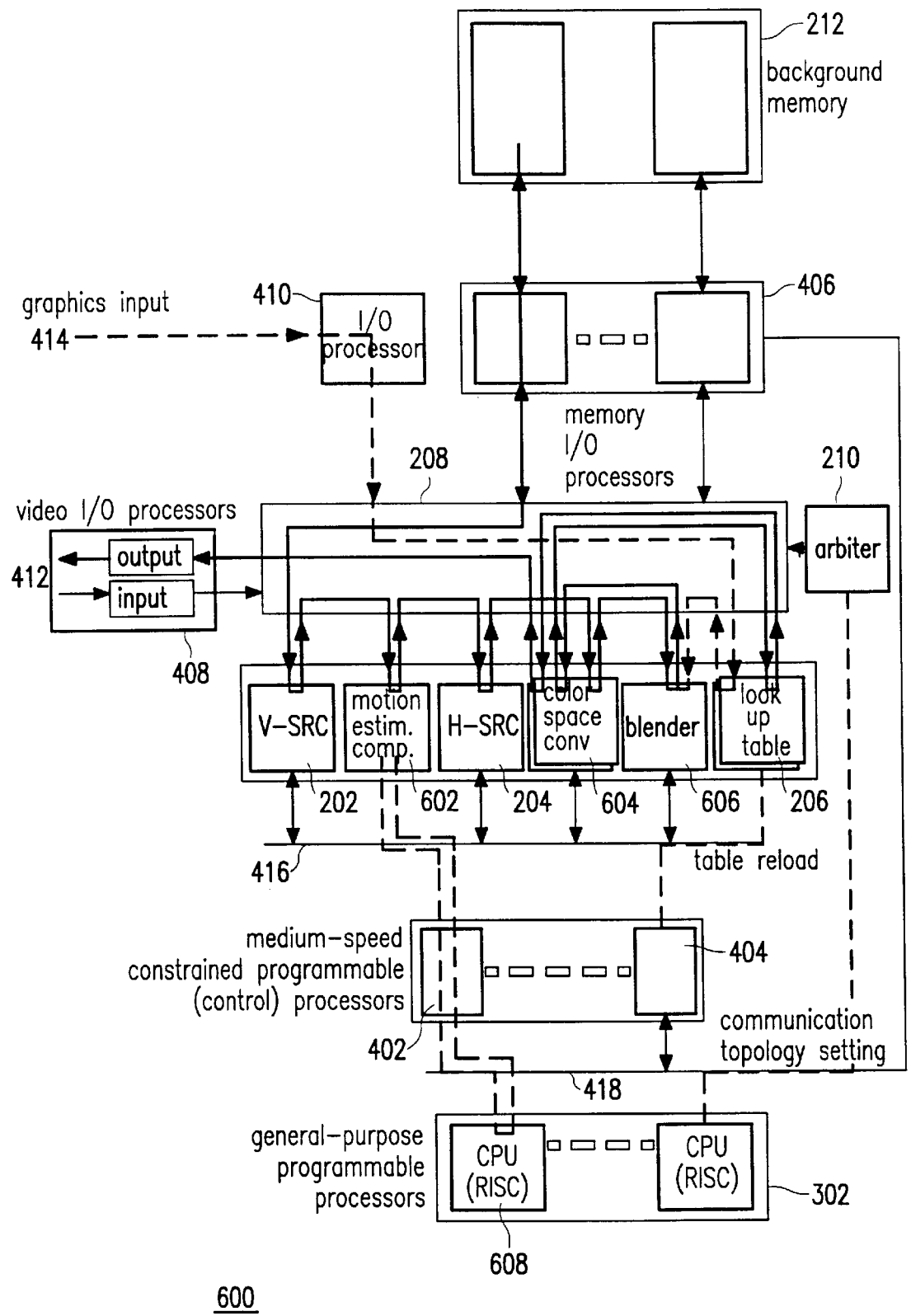
FIG. 6 is a detailed block diagram of a multi-processor architecture for implementing the data flow graph of FIG. 5.

FIG. 6 is an annotated block diagram of a multi-processor system 600 in the invention. System 600 operates according to the data flow graph of FIG. 5. Video data is fetched from background memory 212 via memory interface processors 406. The video data is successively routed through particular ones of task-specific processors 202–206, 602, 604 and 606 that perform following tasks: vertical sample-rate conversion ("V-SRC") in processor 202, motion estimation and compensation ("motion estim. comp.") in processor 602, horizontal sample-rate conversion ("H-SRC") in processor 204, and colour space conversion ("color space conv") in processor 604, e.g., from 4:2:2 to 4:4:4. Graphics data available at input 414 is processed by I/O processor 410 and is supplied to processor 206 for table-look-up. The video data and graphics data then are supplied to a blender 606, and from there the data are processed via colour space conversion in processor 604, table look-up in processor 206, e.g., for gamma setting and further colour space conversion in processor 604 prior to being supplied to the video output at 412.

Note the flow of data between task-specific processor 602 (motion estimation and compensation) and a CPU 608 among fully programmable general-purpose processors 302. This data flow is due to a partitioning of the motion estimation/compensation algorithm into a high-speed portion and a low-speed irregular portion. Motion estimator 602 supplies vector information to CPU 608 which thereupon selects a best candidate and sends it back for use by motion estimator 602.

If changes are required in the topology of the communication among the task-specific processors 202–206 and 602–606, these changes occur on a time scale much larger than that of, e.g., the execution of a primitive function. Accordingly, the data flow graph is loaded into arbiter 210 or updated via general-purpose processors 302.

Fifth Embodiment

Figure 7:
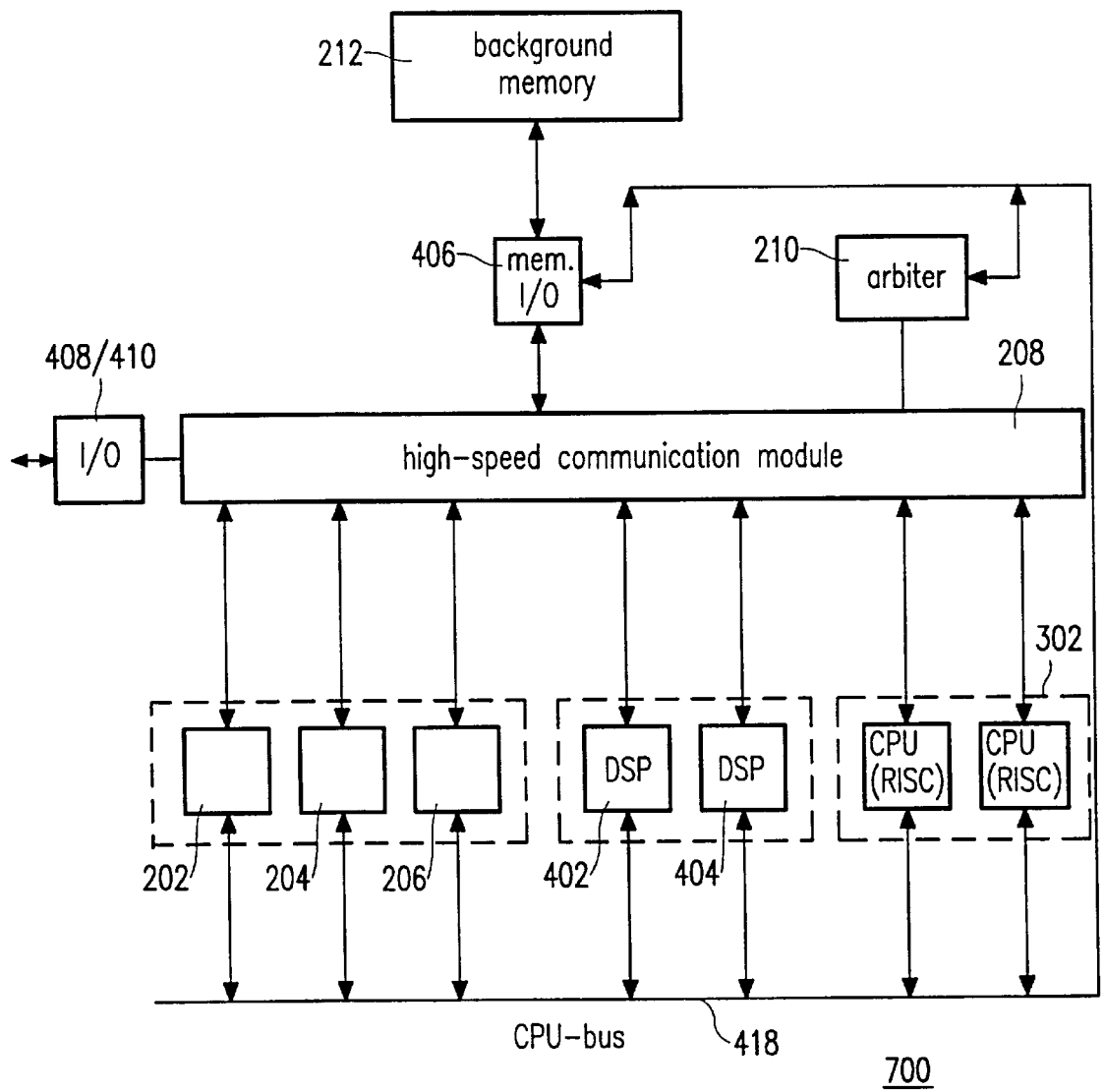
FIG. 7 is a further block diagram of a multi-processor architecture according to the invention.

FIG. 7 is a block diagram of a fifth embodiment of a system 700 according to the invention. FIGS. 3, 4 and 6 show architectures wherein processors belonging to different levels of performance-density and programmability are hierarchically interconnected. For example, task-specific processor 602 functioning as a motion estimator/compensator at the high performance-density level in system 600 of FIG. 6 communicates with general-purpose processor 608 at the low performance-density level via constrainedly programmable processor 402 residing at the intermediate performance-density level. Two or more different levels, however, can be merged as far as interconnectivity is concerned, i.e., processors shown previously at different levels can be connected in parallel. All levels are merged into a single one in the example of system 700. Task-specific processors 202–206 of high performance-density, constrainedly programmable processors 402–404 of intermediate performance-density, e.g., DSPs, and fully programmable low performance density processors 302, e.g., RISCs, are all uniformly connected between communication module 208 and CPU-bus 418. This parallelism enables continuous and direct exchange of data among the processors arranged in parallel. High-speed communication is taken care of by module 208, and low-speed communication by CPU-bus 418. Arbiter 210 and memory I/O processors 406 are connected to CPU-bus 418 in system 700 as shown. Note, however, that arbiter 210 and memory I/O processors 406 do not need to be connected to CPU-bus 418 since they can be accessed through module 208 as well.

We claim:

1. A video data processing system operative to process video data according to a video algorithm and comprising multiple processors interconnected via communication means; characterized in that the multiple processors include a plurality of respective task-processors for execution of a respective one of a plurality of primitive functions at an image processing level of the video algorithm, the primitive functions being used in common by multiple multi-media video applications, wherein:

each of the task-specific processors has a performance-density considerably higher than that of a typical general-purpose processor and each of the task-specific processors is un-programmable or has a level of programmability substantially lower than that of a typical general-purpose processor; and in that the communication means comprises:

a communication module coupled in parallel to the task-specific processors for enabling parallel communication among arbitrary ones of the task-specific processors, and wherein the task specific processors perform the same primitive functions for each of a plurality of the multi-media video applications.

2. The system of claim 1, wherein a respective one of the primitive functions includes a respective one of following tasks: filtering; DCT; colour space conversion; sample rate conversion; motion estimation and motion compensation; feature extraction; blending of graphics data and video data; table look-up; variable-length decoding.

3. The system of claim 2, wherein at least a specific one of the task-specific processors is parametrizable in order to enable control of an associated one of the primitive functions through altering a value of a parameter.

4. The system of claim 3, wherein the multiple processors include at least one general-purpose processor (302; 608), the general-purpose processor having a performance-density substantially lower than that of each task-specific processor, and having a level of programmability substantially higher than that of each task-specific processor.

5. The system of claim 4, wherein the general-purpose processor is operative to execute a portion of the algorithm unsuitable for being mapped onto the primitive functions.

6. The system of claim 4, wherein the multiple processors include at least one further processor having an intermediate performance-density level and programmability level lying between those of the general-purpose processor and each task-specific processor.

7. The system of claim 6, wherein the further processor is operative to at least perform one of following tasks:

controlling the task-specific processors;

functioning as a graphics co-processor executing a portion of the algorithm unsuitable for being mapped onto the primitive functions.

8. The system of claim 5, comprising a port for connection to a background memory and wherein:

a particular one of the task-specific processors performs feature extraction;

the general-purpose processor is operative to obtain access to the port via the particular task-specific processor.

9. The system of claim 1, comprising a communication arbiter operative to control communication provided by the communication module under guidance of a data flow graph stored in the communication arbiter.

10. The system of claim 4, comprising a communication arbiter operative to control communication provided by the communication module under guidance of a data flow graph stored in the communication arbiter, and wherein the general purpose processor is operative to control the data flow graph.

11. The system of claim 1 integrated on a semiconductor substrate.

12. The system of claim 1, wherein at least a specific one of the task-specific processors is parametrizable in order to enable control of an associated one of the primitive functions through altering a value of a parameter.

13. The system of claim 2, wherein the multiple processors include at least one general-purpose processor (302; 608), the general-purpose processor having a performance-density substantially lower than that of each task-specific processor, and having a level of programmability substantially higher than that of each task-specific processor.

14. The system of claim 13, wherein the general-purpose processor is operative to execute a portion of the algorithm unsuitable for being mapped onto the primitive functions.

15. The system of claim 1, wherein the multiple processors include at least one general-purpose processor (302; 608), the general-purpose processor having a performance-density substantially lower than that of each task-specific processor, and having a level of programmability substantially higher than that of each task-specific processor.

16. The system of claim 15, wherein the general-purpose processor is operative to execute a portion of the algorithm unsuitable for being mapped onto the primitive functions.

17. The system of claim 1, wherein the multiple processors include at least one further processor having an intermediate performance-density level and programmability level lying between those of the general-purpose processor and each task-specific processor.

18. The system of claim 4, comprising a port for connection to a background memory and wherein:

a particular one of the task-specific processors performs feature extraction;

the general-purpose processor is operative to obtain access to the port via the particular task-specific processor.

* * * * *